United States Patent [19]

Gilardi

[11] 3,994,185
[45] Nov. 30, 1976

[54] SHEATHED CABLE FOR TRANSMITTING REMOTE CONTROL ACTIONS AND THE RELATIVE MANUFACTURING PROCESS

[75] Inventor: Carlo Gilardi, Lugano, Switzerland

[73] Assignee: Anstalt Egra, Vaduz, Liechtenstein

[22] Filed: Aug. 2, 1974

[21] Appl. No.: 494,121

[30] Foreign Application Priority Data
Sept. 26, 1973  Switzerland.................... 13768/73

[52] U.S. Cl. ............................................ 74/501 P
[51] Int. Cl.² ........................................ F16C 1/10
[58] Field of Search ............ 74/501 R; 64/2 R, 2 P, 64/8

[56] References Cited
UNITED STATES PATENTS

| | | |
|---|---|---|
| 2,730,134 | 1/1956 | Morse................................. 74/501 P |
| 3,176,538 | 4/1965 | Hurlow.............................. 74/501 P |

*Primary Examiner*—Samuel Scott
*Assistant Examiner*—Frank H. McKenzie, Jr.
*Attorney, Agent, or Firm*—Ladas, Parry, Von Gehr, Goldsmith & Deschamps

[57] ABSTRACT

Sheathed cable for transmitting remote control actions by the relative axial movement between the cable and sheath is described. A terminal piece is rigid with each end of said sheath for connecting the end to a mechanical member and provided with a tubular element connected to said terminal piece so as to permit swing of the axis of the tubular element with respect to the terminal piece, said terminal piece being made of plastics material.

5 Claims, 8 Drawing Figures

3,994,185

SHEATHED CABLE FOR TRANSMITTING REMOTE CONTROL ACTIONS AND THE RELATIVE MANUFACTURING PROCESS

CROSS REFERENCE TO RELATED APPLICATION

Applicant claims priority from corresponding Swiss patent application Ser. No. 13768/73 filed Sept. 26, 1973.

BACKGROUND OF THE INVENTION

This invention relates to a metal cable with a covering sheath of the type suitable for transmitting remote control actions by the relative axial movement between the cable and sheath which requires a very small force for its operation and may be constructed simple and at low cost.

Cables are available for transmitting remote control actions comprising substantially a metal cable which slides within a sheath the purpose of which is to form the sliding seat for the cable, to act as a reaction element and to protect the cable itself. The member of the device or machine to be controlled may be connected either to the sliding cable or to the relative sheath.

Cables of the type described comprise a sheath with a structure designed for mechanical strength, consisting substantially of a plurality of metal wires wound as a helix, the structure being lined both internally and externally. At each end of the sheath there is a terminal piece of substantially tubular form which is fixed to the sheath and provided with means for connecting it to a member. The end of said terminal piece is normally provided with a cavity in which is housed the end of a tubular element, so as to form a ball joint to enable the angular position of said element to be varied with respect to the terminal piece.

Each end of the sliding cable is provided with a cylindrical rod which can slide inside the first mentioned tubular element and is also provided with means for connecting it to a member.

Sheathed cables of the type described have certain disadvantages.

Firstly, as the cable is in contact with the inner sheath lining, the coefficient of friction between the lining and cable is not particularly small, and because of this a rather large force is generally necessary to obtain axial movements of the cable relative to the sheath.

Moreover, because of the presence of the said parts connected to each end of the sheath and cable, the manufacturing process for a sheathed cable of the type described involves numerous complicated manufacturing stages, with the result that the cable obtained by it is costly. In this respect, the terminal piece of the sheath, the tubular element connected to it and the rod fixed to the end of each cable are metal, and their construction involves mechanical operations for removing swarf and for providing permanent deformation. In addition, rather complicated assembly operations are involved in fixing them to the sheath and cable.

SUMMARY OF THE INVENTION

The object of the present invention is to provide a sheathed cable able to transmit remote control actions by the relative axial movement between the cable and sheath, by which the aforementioned disadvantages are eliminated.

The sheathed cable according to the invention, in which a terminal piece is rigid with each end of said sheath for connecting the end to a mechanical member, and is provided with a tubular element connected to said terminal piece in such a manner as to permit swing of the axis of this element with respect to the terminal piece, is characterised in that said terminal piece is constructed of plastics material moulded directly on to said end of the sheath.

According to a further characteristic of the present invention, said terminal piece is provided with a substantially spherical, elastically deformable seat, into which a head of substantially spherical shaped form on said tubular element is snap inserted by elastic deformation of the seat, the tubular element being constructed of plastics material.

According to a further characteristic of the invention, said cable is lined with a layer of plastics material.

A further object of the present invention is to provide a process for simply and economically constructing said cable.

BRIEF DESCRIPTION OF THE DRAWINGS

For a better understanding of the present invention, a description is given hereinafter of one embodiment by way of example, with reference to the accompanying drawings in which.

DETAILED DESCRIPTION OF THE INVENTION

Figure 1:
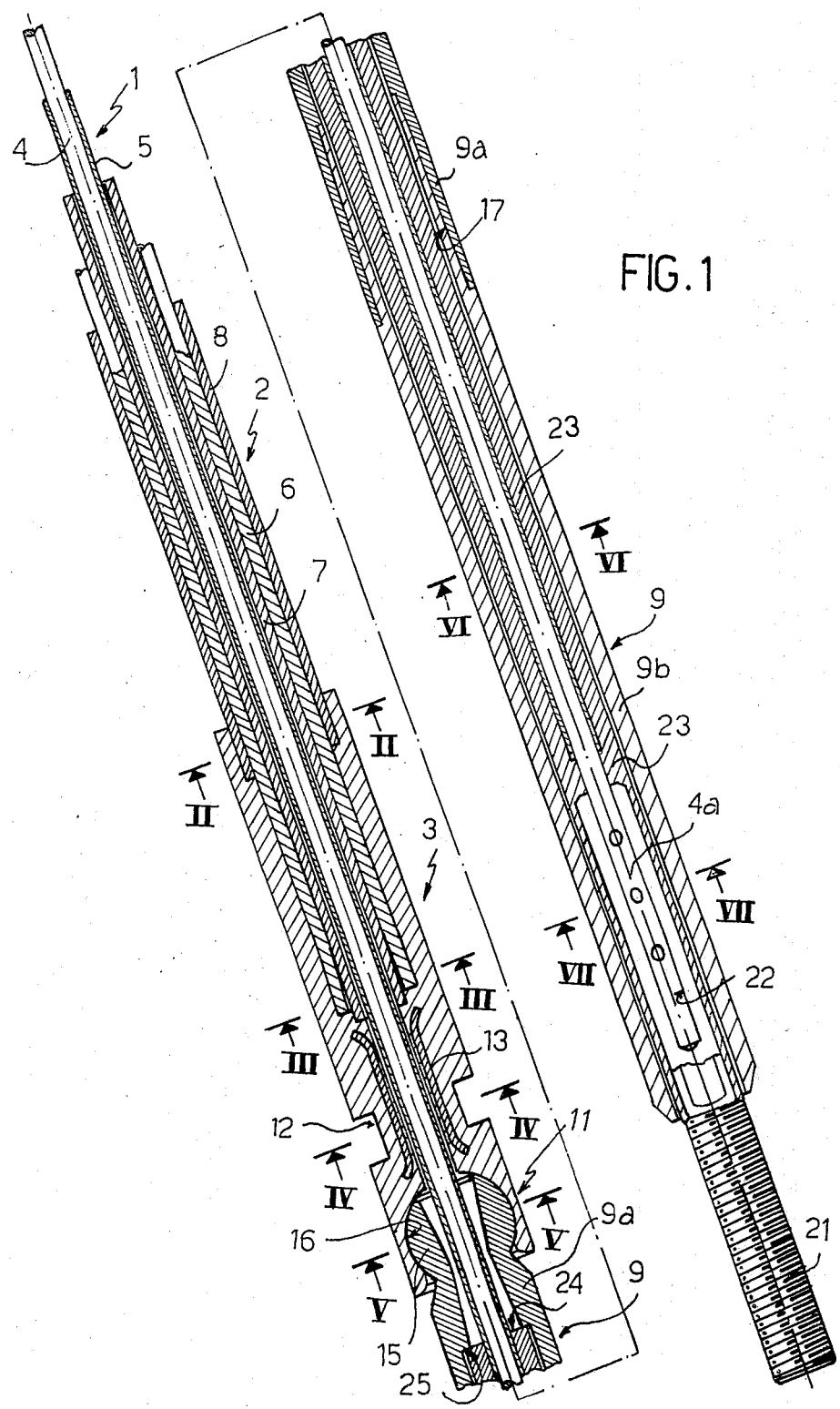
FIG. 1 is a longitudinal section through an end part of the sheathed cable according to the invention.

With reference firstly to FIG. 1, the sheathed cable according to the invention comprises substantially an actual cable, indicated overall by 1, which can slide within a deformable sheath 2, which is provided with a terminal piece indicated overall by 3.

The cable 1 comprises substantially a deformable element 4, consisting for example of a normal steel cable with one or more wires or a number of strands wound as a helix, these latter in their turn possibly comprising a number of wires. The cable is also provided with a thin lining 5, adhering to the cable and made from a material which gives rise to a low coefficient of friction in conjunction with the material of the inner lining of the sheath 2, which will be more fully described hereinafter. Conveniently, the material of the lining 5 may be a plastics material, for example a thermoplastic material, suitably filled with components for reducing friction, and placed on the cable 4, this latter then being passed through an extruder for plastics materials. In addition to the stated purpose of enabling the cable 1 to move with respect to the sheath 2 at a low coefficient of friction, the lining 5 also has the purpose of protecting the cable 4 from the action of external agents, for example to prevent its corrosion. For this reason, because of the lining 5, the cable 4 may be made from common steel, i.e. steel which is not stainless.

Figure 2:
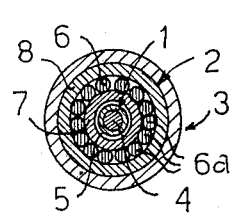
FIGS. 2, 3, 4, 5, 6 and 7 are cross sections through the cable of FIG. 1 on the lines II—II, III—III, IV—IV, V—V, VI—VI and VII—VII respectively.
Figure 3:
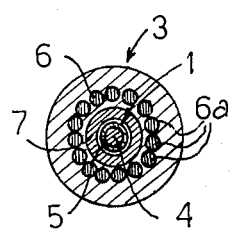
Figure 4:
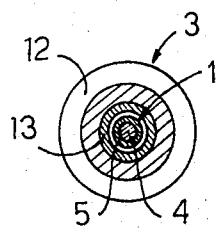
Figure 5:
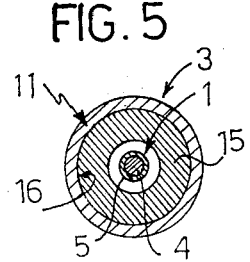
Figure 6:
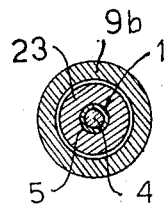
Figure 7:
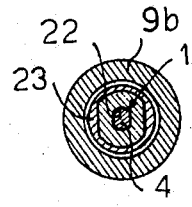

The sheath 2 comprises a structure to give it mechanical strength, 6, of the type normally used in previous known sheathes and comprising, for example, a plurality of steel wires 6a (FIG. 2) wound as a helix.

Conveniently, but not necessarily, each wire 6a of the structure 6 may in its turn be provided with its own external lining of plastics material (not shown), to protect the wire, and in particular to allow easy axial movement of one wire relative to the adjacent ones to increase deformability of the sheath by bending. A further favourable effect of the said lining is a reduction in the number of wires 6a of the structure 6 for equal wire diameters, a condition obtainable in particular when the mechanical strength required of the structure 6 is fairly small.

The sheath 2 also comprises an inner lining layer 7 and an outer lining layer 8, each consisting of plastics material. The first layer is conveniently made from a plastics material which in conjunction with the plastics material of the lining 5 presents a very low coefficient of friction. A suitable plastics material for this purpose is a thermoplastic material, in particular an acetalic resin. The material of the lining layer 8 must have high resistance to atmospheric agents, even at high temperature, and must be able to be formed directly on the structure 6. The material must also be compatible with the material of the terminal piece 3, so as to permit this latter to be formed directly on the lining layer 8 by injection moulding, or if the terminal piece is preformed, to enable it to be joined by friction or ultrasonic welding systems.

A tubular element 9 is connected to the terminal piece 3 by a ball joint, indicated overall by 11. The terminal piece 3 is constructed of a thermoplastic material and comprises a part which is either directly moulded with the end of the sheath 2 or otherwise joined to this latter, so that it is partly disposed above the structure 6 and partly above the lining 8 of the structure. Conveniently, this terminal piece is provided with an annular groove 12 which enables the sheath to be fixed to a mechanical member by known means. At the groove 12, the terminal piece 3 is provided with a metal insert 13 of tubular shape, to stiffen it at its smallest cross section, which occurs at the groove 12.

Figure 8:
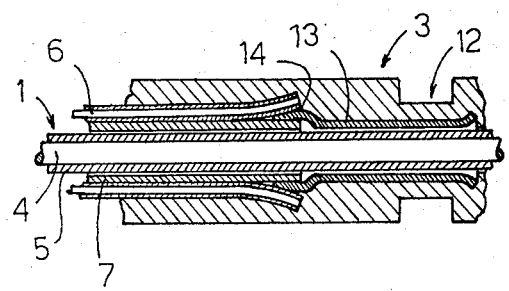
FIG. 8 is a longitudinal section through part of a modified embodiment of the cable according to the invention.

According to a modified embodiment shown in FIG. 8, the insert 13 may comprise an end part 14 having a diameter greater than the central part which is inserted below the structure 6 to force the wires 6a of the structure apart, as this figure clearly shows. In this manner the coupling between the terminal piece 3 and sheath 2 is improved because of the undercut formed by the opened ends of the wires 6a.

The tubular element 9 comprises substantially two parts, a part 9a provided with a substantially spherical head 15 for seating in a corresponding spherical seat 16 at the end of the terminal piece 3 and a substantially conical end cavity 17, and the other part 9b provided with a conical end portion which can be coupled, for example by elastically forcing or welding, to the inside of the conical cavity 17. Conveniently, the parts 9a and 9b are both made of thermoplastics material by injection moulding.

A rod 21 is fixed to the end 4a of each cable 4 for connecting the cable to the member to be controlled by it, and it is conveniently provided with fixing means such as grooves, threads or the like. The rod is connected, as explained hereinafter, to the end 4a by inserting this latter into a cylindrical hole 22 and performing a permanent deformation operation to deform both the rod and the end 4a of the cable, so as to permanently fix them together.

The end part of each cable 1 is lined with a lining layer 23 which forms a cylindrical element with an outside diameter substantially equal to that of the rod 21. This lining is also conveniently made of thermoplastic material by injection moulding. The end 24 of the lining 23 abuts against a shoulder 25 formed in the part 9a of the tubular element 9, as is clearly visible in FIG. 1. Consequently the lining layer 23 and rod 21, both rigid with the cable 4, can slide within the tubular element 9, connected by the ball joint 11 to the terminal piece 3.

It is evident that the sheathed cable according to the invention requires a very small operational force because of the low coefficient of friction between the contacting surfaces between which the relative movement between the cable 4 and sheath 2 takes place. This is obtained because of the low coefficient of friction of the materials forming the lining layers 5 and 7.

Moreover, as will be further explained herinafter, the seal formed between the head 15 and seat 16 in the joint 11 prevents the entry into it of any foreign substance which could come into contact with the cable 1. It follows that efficient protection of the cable 1 against external agents is obtained without the aid of gaskets, as used in previously known cables. A similar protection action can be provided for the rod 21 and cable 1, by the action of the edges of the part 9b of the tubular element 9. In this respect, if these edges are bevelled as shown in FIG. 1, by deforming them radially they are brought into contact with the rod 21 to form a seal between the rod and edges.

The sheathed cable according to the invention can be constructed by a very simple process involving low manufacturing costs (its constituent parts, with the exception of the structure 6, the insert 13 and rod 21, being completely of plastics material), as is evident from the following description of the main stages of the process.

The steel cable to form the deformable cylindrical element is first straightened in a wire straightening device and is then passed through a thermoplastics material extruder so that it becomes covered with the lining layer 5. It is passed through a cooling tank and then cut to a predetermined length on an automatic line. The end 4a of the cable I prepared in this manner is freed from a part of the lining 5, is then permanently deformed, for example at three points, and introduced into the hole 22 in a rod 21 to which it is fixed, by permanent deformation obtained, for example, by a press.

The lining layer 23 is then formed on the end of the cable 1 prepared in this manner and on the rod 21, by injection moulding.

In constructing the sheath 2, the structure 6 is first prepared on the inner lining 7 using a special known machine, which winds the wires 6a substantially as a helix. The outer lining layer 8 can then be continuously extruded. The extruded layers are then cooled and the sheath is cut to the predetermined length. The ends of each sheath are inserted in a mould for plastics materials which moulds the terminal piece 3 on each of them by injection moulding. This moulding operation may be carried out simultaneously on both ends of the sheath, or in succession so as to form the two terminal pieces 3 of each sheath 2 in two different stages. Alternatively, the terminal pieces may be premoulded and then fixed to the sheath 2, for example by friction or ultrasonic welding. At this point, the spherical head 15 of a part 9a of the tubular element 9 may be introduced into the cavity 16 of each terminal piece 3 by elastic deformation. This introduction takes place by elastically deforming the material of the terminal piece 3 situated around the cavity 16. When the head 15 has been mounted, the pressure exchanged between this latter and the seat 16 creates a perfect seal between these parts, so preventing foreign substances entering inside the joint 11 and coming into contact with the cable 1. Contrary to that which takes place in previous embodiments, the seal for the joint 11 is obtained without the help of gaskets.

After this stage of the process, a cable 1, prepared in the previously described manner, may be inserted into a corresponding sheath by inserting that end of the cable to which the rod 21 has not yet been fixed, into one end of the sheath 2. On that end of the cable 1 which is not yet complete, the relative rod 21 may now be mounted and the lining layer 23 laid in a manner similar to that stated with reference to the preparation of the other end of the cable. Finally, the part 9b of the tubular element 9 is mounted on each end of the sheath 2, by fixing the conical portion of each of them into the relative conical cavity 17 of the other part 17a by elastic forcing, welding or the like.

What we claim is:

1. Sheathed cable for transmitting remote control actions by therelative axial movement between the cable and sheath, a terminal piece being rigid with each end of said sheath for connecting the end to a mechanical member and provided with a tubular element connected to said terminal piece so as to permit swing of the axis of the tubular element with respect to the terminal piece, in which said terminal piece is made of plastics material and is provided with a tubular metal stiffening insert disposed between said end of the sheath and said tubular element.

2. Sheathed cable for transmitting remote control actions by the relative axial movement between the cable and sheath, a terminal piece being rigid with each end of said sheath for connecting the end to a mechanical member and provided with a tubular element connected to said terminal piece so as to permit swing of the axis of the tubular element with respect to the terminal piece, in which said terminal piece is made of plastics material, and in which said sheath comprises a deformable tubular structure to provide mechanical strength, said structure being provided with outer and inner linings made of a plastics material which can be laid on said structure by extrusion.

3. Cable as claimed in claim 2, in which said structure comprises deformable metal elements, each of said deformable elements being lined with a layer of plastics material.

4. Sheathed cable for transmitting remote control actions by the relative axial movement between the cable and sheath, a terminal piece being rigid with each end of said sheath for connecting the end to a mechanical member and provided with a tubular element connected to said terminal piece so as to permit swing of the axis of the tubular element with respect to the terminal piece, in which said terminal piece is made of plastics material and said cable is lined with a layer of plastics material and the end of the cable is connected to a metal connecting element arranged to form a connection between said end and a mechanical member, in which on said plastics material lining disposed on said cable there is disposed a second layer of plastics material arranged to come into contact with said connecting element and to slide within said tubular element.

5. Sheathed cable as claimed in claim 4, in which a shoulder is formed in said tubular element as a stop for said second layer of plastics material.

* * * * *